(12) United States Patent
Iwanaga

(10) Patent No.: US 10,428,893 B2
(45) Date of Patent: Oct. 1, 2019

(54) VEHICULAR BODY REINFORCING DEVICE

(71) Applicant: AISIN SEIKI KABUSHIKI KAISHA, Kariya-shi, Aichi-ken (JP)

(72) Inventor: Soichiro Iwanaga, Kariya (JP)

(73) Assignee: AISEN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 236 days.

(21) Appl. No.: 15/516,583

(22) PCT Filed: Sep. 11, 2015

(86) PCT No.: PCT/JP2015/075805
§ 371 (c)(1),
(2) Date: Apr. 3, 2017

(87) PCT Pub. No.: WO2016/067770
PCT Pub. Date: May 6, 2016

(65) Prior Publication Data
US 2018/0149227 A1    May 31, 2018

(30) Foreign Application Priority Data

Oct. 28, 2014 (JP) ................................. 2014-219201

(51) Int. Cl.
*F16F 7/09* (2006.01)
*F16F 15/02* (2006.01)
(Continued)

(52) U.S. Cl.
CPC ............... *F16F 7/09* (2013.01); *B62D 21/04* (2013.01); *B62D 25/088* (2013.01); *F16F 7/082* (2013.01);
(Continued)

(58) Field of Classification Search
CPC ... F16F 7/09; F16F 7/082; F16F 15/02; B62D 21/04; B62D 25/088; B62D 21/152; B62D 25/00; B60Y 2306/01
(Continued)

(56) References Cited

U.S. PATENT DOCUMENTS 4,236,606 A * 12/1980 Sunakoda ............... F16L 3/202
188/134
4,275,802 A * 6/1981 de Groot ................. F16L 3/202
188/134
(Continued)

FOREIGN PATENT DOCUMENTS

JP    3430174 B2    7/2003
JP    3113995 U     9/2005
JP    4865698 B2    2/2012

OTHER PUBLICATIONS

International Search Report (PCT/ISA/210) dated Nov. 17, 2015, by the Japanese Patent Office as the International Searching Authority for International Application No. PCT/JP2015/075805.
(Continued)

*Primary Examiner* — Nkeisha Smith
(74) *Attorney, Agent, or Firm* — Buchanan Ingersoll & Rooney PC

(57) ABSTRACT

One end portion of a rod member is accommodated in a housing which is connected to one bracket BR1, and the other one end portion is connected to the other bracket. Between the one end portion of the rod member and the housing, there is disposed a biasing mechanism which biases against forces that enlarge and shorten an axial distance between the brackets. Furthermore, a friction mechanism, which presses the housing in a direction perpendicular to an axis of the rod member, is accommodated in the housing. The friction mechanism comprises a pressing member which is supported on the rod member to be in contact with an inner
(Continued)

surface of the housing, a spring member and an adjusting member, so that a pressing force of the pressing member to the housing by the spring member is adjusted by the adjusting member.

7 Claims, 4 Drawing Sheets

(51) Int. Cl.
  *F16F 7/08* (2006.01)
  *B62D 21/04* (2006.01)
  *B62D 25/08* (2006.01)
  *B62D 25/00* (2006.01)
  *B62D 21/15* (2006.01)
(52) U.S. Cl.
  CPC .......... *F16F 15/02* (2013.01); *B60Y 2306/01* (2013.01); *B62D 21/152* (2013.01); *B62D 25/00* (2013.01)
(58) Field of Classification Search
  USPC ............. 248/562, 636, 608, 610, 575, 560
  See application file for complete search history.

(56) References Cited

U.S. PATENT DOCUMENTS

| | | | | |
|---|---|---|---|---|
| 4,431,093 A * | 2/1984 | Yang | .................. | F16F 7/1022 188/129 |
| 4,524,851 A * | 6/1985 | Sawano | .............. | F16F 7/1022 188/134 |
| 4,709,779 A * | 12/1987 | Takehara | ............. | F16F 13/262 180/300 |
| 5,257,680 A | 11/1993 | Corcoran et al. | | |
| 7,673,904 B2 | 3/2010 | Harada et al. | | |
| 9,022,185 B2 * | 5/2015 | Kanioz | ................... | D06F 37/20 188/272 |
| 9,079,256 B2 * | 7/2015 | Freyermuth | ............ | B23B 31/02 |
| 9,475,594 B2 * | 10/2016 | Barber | ................... | B64G 1/641 |
| 9,752,638 B2 * | 9/2017 | Kanioz | .................... | F16F 7/09 |
| 2002/0056969 A1 | 5/2002 | Sawai et al. | | |
| 2006/0125225 A1 | 6/2006 | Kondou et al. | | |
| 2006/0220420 A1 | 10/2006 | Doi et al. | | |
| 2011/0133520 A1 | 6/2011 | Kondou et al. | | |
| 2014/0375041 A1 * | 12/2014 | Nakajima | ............. | F16F 9/3207 280/782 |
| 2015/0204406 A1 * | 7/2015 | Yoon | ....................... | F16F 6/005 248/562 |
| 2018/0073589 A1 * | 3/2018 | Weder | ..................... | F16F 7/085 |
| 2018/0266514 A1 * | 9/2018 | Mori | ........................ | F16F 9/34 |

OTHER PUBLICATIONS

Written Opinion (PCT/ISA/237) dated Nov. 17, 2015, by the Japanese Patent Office as the International Searching Authority for International Application No. PCT/JP2015/075805.

* cited by examiner

VEHICULAR BODY REINFORCING DEVICE

TECHNICAL FIELD

The present invention relates to a vehicle body reinforcing device, particularly the vehicle body reinforcing device that can be attached to a vehicle.

BACKGROUND ART

As for a vehicle body reinforcing device that can be attached to an existing vehicle, there is known heretofore the vehicle body reinforcing device that is supported on the vehicle body by brackets disposed at both axial ends of the device. For example, in Patent document 1 as listed below, "in order to provide a reinforcement device for the vehicle body frame that makes it possible to easily improve ride comfort by attachment or removal of the reinforcement member according to the preference of the driver" as an object (described in Paragraph (0011) of Patent document 1), with respect to "the vehicle body reinforcement device formed in elongated shape and with a force generating means for generating a hydraulic damping force against its longitudinal deformation interposed in its middle", the vehicle body reinforcing device defined by various requirements has been proposed (described in Paragraph (0012) of the same).

PRIOR ART DOCUMENT

Patent Document

Patent document 1: Japanese Patent No. 4865698

SUMMARY OF THE INVENTION

Problems to be Solved by the Invention

According to the vehicle body reinforcing device as disclosed in the above Patent document 1, as for the damping force generating means, employed is a hydraulic damping device, which is not only difficult in adjusting the damping force relative to a displacement, but also various hydraulic damping devices have to be prepared in accordance with vehicle models or places to be mounted, to result in lack of versatility required for an add-on part attachable to the vehicle.

According to the present invention, therefore, with respect to a vehicle body reinforcing device that is supported on a vehicle body by brackets disposed at both axial ends of the device, it is an object to provide the vehicle body reinforcing device with a simple structure, which can be attached to various vehicles and various places to be mounted.

Means for Solving the Problems

To solve the above-described problems, the present invention relates to a vehicle body reinforcing device, which comprises brackets that support both axial ends of the device on a vehicle body, a housing which is connected to one bracket of the brackets that support the both ends, a rod member that has one end portion which is accommodated in the housing, and the other one end portion which is connected to the other one bracket of the brackets that support the both ends, a biasing mechanism which is disposed between the one end portion of the rod member and the housing, and which biases against forces that enlarge and shorten an axial distance between the one bracket and the other one bracket, and a friction mechanism which is supported on the rod member within the housing, and which presses the housing in a direction perpendicular to an axis of the rod member.

In the above-described vehicle body reinforcing device, the friction mechanism may comprise a pressing member which is movably supported on the rod member in the direction perpendicular to the axis of the rod member, and which is disposed to be in contact with an inner surface of the housing, a spring member which is disposed between the pressing member and the rod member, and which biases the pressing member to press the inner surface of the housing, and an adjusting member that adjusts a pressing force of the pressing member to the housing by the spring member.

It may be so configured that the rod member has a through hole in the direction perpendicular to the axis of the rod member, and that the spring member of the friction mechanism is accommodated in the through hole, and the pressing member is press-fitted into the through hole and held in the through hole together with the spring member, and that the adjusting member holds the spring member at a predetermined position in the through hole.

The friction mechanism may comprise a support member which is disposed between the adjusting member and the pressing member, and which supports the spring member movably in the through hole, and it may be so configured that the adjusting member holds the support member at a predetermined position in the through hole.

Also, in the above-described vehicle body reinforcing device, the biasing mechanism may comprise a first spring member and a second spring member, which bias the rod member against the axial movement of the rod member. The biasing mechanism may comprise an engaging member which is accommodated in the housing, and which is engaged with the housing at a predetermined axial position of the rod member, and it may be so configured that the first spring member and second spring member are engaged with the rod member at axially opposite sides of the rod member through the engaging member.

Furthermore, the rod member may comprise a first axial member and a second axial member, and a connecting member that connects the first axial member and the second axial member in an axial direction in the housing, and it may be so configured that the biasing mechanism is disposed between the first axial member and the connecting member.

In the above-described vehicle body reinforcing device, the housing may comprise a case which is integrally formed with the one bracket in a cylindrical shape with a bottom, and which accommodates the first axial member, an annular member which is connected to the case, with the engaging member being held between the annular member and an opening portion of the case, and a cover which is connected to the case, with the annular member, the biasing mechanism, the friction mechanism and a part of the rod member being accommodated in the case.

Furthermore, in the above-described vehicle body reinforcing device, the housing may have a side wall thereof with a through hole, and it may be so configured that the adjusting member is manipulated through the through hole. Or, the housing may have a side wall thereof with an insert hole, and it may be so configured that the adjusting member is inserted into the housing through the insert hole, and held by the rod member.

Effects of the Invention

As the present invention is configured as described above, the following effects are achieved. That is, the vehicle body reinforcing device according to the present invention is provided with brackets that support both axial ends of the device on a vehicle body, a housing which is connected to one bracket of the brackets that support the both ends, a rod member that has one end portion which is accommodated in the housing, and the other one end portion which is connected to the other one bracket of the brackets that support the both ends, a biasing mechanism which is disposed between the one end portion of the rod member and the housing, and which biases against forces that enlarge and shorten an axial distance between the one bracket and the other one bracket, and a friction mechanism which is supported on the rod member within the housing, and which presses the housing in a direction perpendicular to an axis of the rod member, thereby to configure an easy rigidity adjusting mechanism, which is high in versatility, and which can be attached to various vehicles and various places to be mounted.

In the above-described vehicle body reinforcing device, if it is so configured that the friction mechanism comprises a pressing member which is movably supported on the rod member in the direction perpendicular to the axis of the rod member, and which is disposed to be in contact with an inner surface of the housing, a spring member which is disposed between the pressing member and the rod member, and which biases the pressing member to press the inner surface of the housing, and an adjusting member that adjusts a pressing force of the pressing member to the housing by the spring member, its installing performance on a vehicle is high, and its flexibility of design will be improved. Furthermore, as it is so configured that the pressing member presses the inner surface of the housing, the pressing area by the pressing member will be enlarged, so that spring load can be made high to ensure a large frictional force.

Furthermore, if it is so configured that the rod member has a through hole in the direction perpendicular to the axis of the rod member, and that the spring member of the friction mechanism is accommodated in the through hole, and the pressing member is press-fitted into the through hole and held in the through hole together with the spring member, and that the adjusting member holds the spring member at a predetermined position in the through hole, the frictional force can be easily adjusted. Furthermore, if it is so configured that the friction mechanism comprises a support member which is disposed between the adjusting member and the pressing member, and which supports the spring member movably in the through hole, and that the adjusting member holds the support member at a predetermined position in the through hole, the friction mechanism may be easily assembled into the housing.

In the above-described vehicle body reinforcing device, if it is so configured that the biasing mechanism comprises a first spring member and a second spring member, which bias the rod member against the axial movement of the rod member, the biasing mechanism may be easily configured. And, if it is so configured that the biasing mechanism comprises an engaging member which is accommodated in the housing, and which is engaged with the housing at a predetermined axial position of the rod member, and that the first spring member and second spring member are engaged with the rod member at axially opposite sides of the rod member through the engaging member, the biasing mechanism may be easily assembled in the housing. Furthermore, if it is so configured that the rod member comprises a first axial member and a second axial member, and a connecting member that connects the first axial member and the second axial member in an axial direction in the housing, and that the biasing mechanism is disposed between the first axial member and the connecting member, the biasing mechanism may be assembled more easily.

In the above-described vehicle body reinforcing device, if it is so configured that the housing comprises a case which is integrally formed with the one bracket in a cylindrical shape with a bottom, and which accommodates the first axial member, an annular member which is connected to the case, with the engaging member being held between the annular member and an opening portion of the case, and a cover which is connected to the case, with the annular member, the biasing mechanism, the friction mechanism and a part of the rod member being accommodated in the case, each component part may be assembled into the case of the cylindrical shape with the bottom from one side, so that a mass productivity is improved, and dust and water proof features may be easily ensured. Also, as gripping portions or the like of tools required for assembling it can be gathered at the one side, gripping marks or the like caused by the tools can be concealed by a minimum member such as a cover, so that it can be assembled appropriately without being disfigured.

Furthermore, in the above-described vehicle body reinforcing device, if it is so configured that the housing has a side wall thereof with a through hole, and that the adjusting member is manipulated through the through hole, the frictional force can be easily adjusted. Or, if it is so configured that the housing has a side wall thereof with an insert hole, and that the adjusting member is inserted into the housing through the insert hole, and held by the rod member, not only the frictional force can be easily adjusted, but also an assembly in a finally assembled state can be made.

EMBODIMENTS FOR CARRYING OUT THE INVENTION

Figure 1:
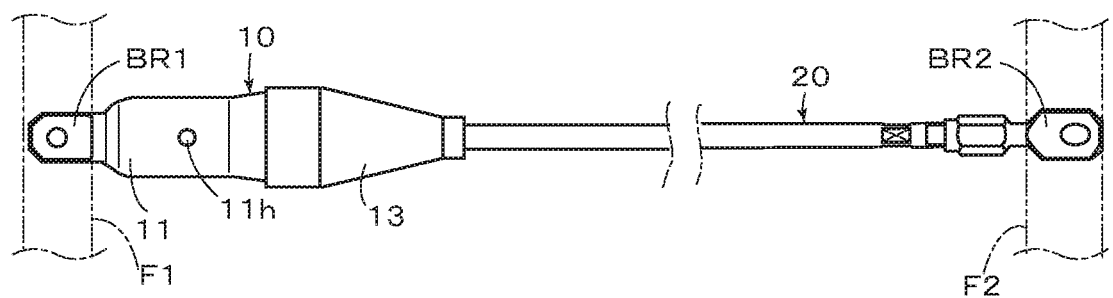
FIG. 1 is a plan view showing an overall configuration of a vehicle body reinforcing device according to an embodiment of the present invention.

Hereinafter, will be explained desirable embodiments of the present invention referring to drawings. FIG. 1 shows an overall configuration of a vehicle body reinforcing device according to an embodiment of the present invention. The vehicle body reinforcing device is mounted on frames F1 and F2 of a vehicle body, through brackets BR1 and BR2 provided at both axial ends of the device, respectively. The bracket BR1 is integrally formed with a part of a housing 10, in which one end portion of a rod member 20 is accommodated, with the other one end portion thereof being screwed with the bracket BR2. The bracket BR1 may be made separately and screwed with the housing 10 in the same manner as the bracket BR2, and the connected structure between the bracket BR and the housing 10 may be provided in any fashion.

Figure 2:
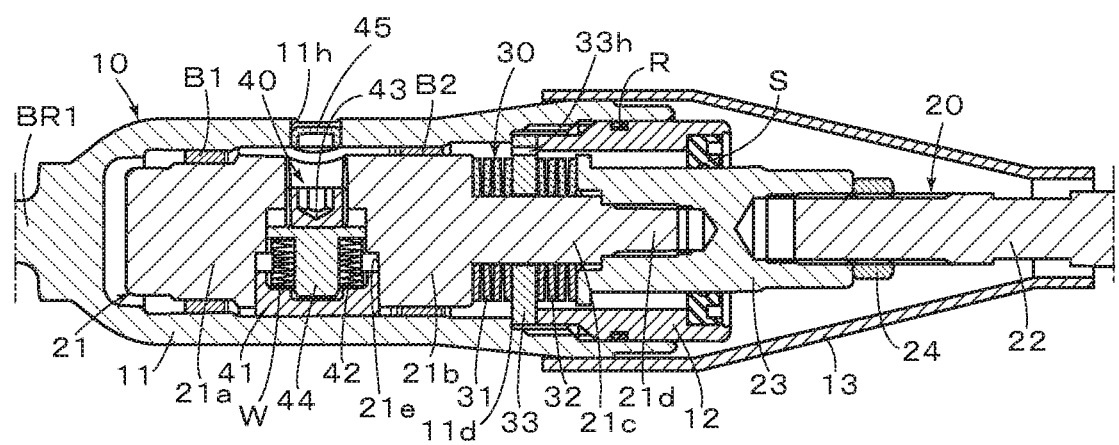
FIG. 2 is a sectional view showing a part of a vehicle body reinforcing device according to an embodiment of the present invention.

FIG. 2 shows a sectional view showing a part (left side part in FIG. 1) of the above-described vehicle body reinforcing device, wherein a biasing mechanism 30 is disposed between the one end portion of the rod member 20 and the housing 10, and biases against forces that enlarge and shorten an axial distance between the brackets BR1 and BR2, to configure a rigidity adjusting mechanism. Furthermore, there is provided a friction mechanism 40 which is supported on the rod member 20 within the housing 10, and which presses the housing 10 in a direction perpendicular to an axis of the rod member 20.

The housing 10 of the present embodiment is configured by a case 11 which is integrally formed with the bracket BR1 in a cylindrical shape with a bottom, and which accommodates a first axial member 21, an annular member 12 which is connected to the case 11, with an engaging member 33 being held between the annular member 12 and an opening portion of the case 11, and a cylindrical cover 13 which is connected to the case, with the annular member 12, the biasing mechanism 30, the friction mechanism 40 and a part of the rod member 20 being accommodated in the case 11. The case 11 and the annular member 12 are screwed to be held at a predetermined position. Furthermore, a through hole 11$h$ is formed on a side wall of the case 11, and the biasing mechanism 30 and friction mechanism 40 are accommodated in the case 11, the details of which will be described later.

On the other hand, the rod member 20 of the present embodiment is divided into the first axial member 21 and second axial member 22, which are connected together by a connecting member 23, and held at a predetermined position by a nut 24. The first axial member 21 is formed into a stepped configuration having an intermediate diameter portion 21$a$, a large diameter portion 21$b$ and a small diameter portion 21$c$, as viewed from its tip end toward a portion connected with the connecting member 23. Furthermore, at the tip end of the small diameter portion 21$c$, there is formed a male screw portion 21$d$, with which (a female screw portion of) the connecting member 23 is screwed, and it is so configured that the first axial member 21 and the connecting member 23 are connected together, in such a state that the biasing mechanism 30 is supported on the small diameter portion 21$c$. With respect to the first axial member 21, its intermediate diameter portion 21$a$ and large diameter portion 21$b$ are supported slidably within the case 11 through bushes B1 and B2, respectively.

On the small diameter portion 21$c$, there are mounted a first spring member 31 and a second spring member 32, which configure the biasing mechanism 30 of the present embodiment. The first spring member 31 and second spring member 32 of the present embodiment are configured by stacking a plurality of disk springs, and a plate-like engaging member 33 is disposed between them. With respect to the first spring member 31 and second spring member 32, a compressed coil spring or the like may be employed. The engaging member 33 is supported to be movable against the small diameter portion 21$c$ of the first axial member 21, and the case 11 and annular member 12 are connected together and engaged with the hosing 10, with a peripheral portion of the engaging member 33 being held between an opening step portion 11$d$ of the case 11 and the annular member 12. Furthermore, the engaging member 33 is formed with a through hole 33$h$. A seal "S" is held on the inner peripheral surface of the opening portion of the annular member 12 so as to be in contact with the second axial member 22, and an O-ring "R" is held on the outer peripheral surface of the annular member 12 to be in contact with the inner peripheral surface of the opening portion of the case 11.

The friction mechanism 40 of the present embodiment comprises a pressing member 41 which is movably supported on the rod member 20 in the direction perpendicular to the axis of the rod member 20, and which is disposed to be in contact with an inner surface of the housing 10, a spring member 42 which is disposed between the pressing member 41 and the rod member 20, and which biases the pressing member 41 to press the inner surface of the housing 10, and an adjusting member 43 that adjusts a pressing force of the pressing member 20 to the housing 10 by the spring member 42, and it is so configured that the pressing member 41 presses the inner surface of the housing 10 in the direction perpendicular to the axis of the rod member 20. According to the present embodiment, a support member 44 and a washer "W" are disposed between the pressing member 41 and the adjusting member 43.

As shown in FIG. 2, the large diameter portion 21$b$ of first axial member 21 is formed with a stepped through hole (stepped hole 21$e$) in a direction perpendicular to its axis (i.e., radial direction), so that the support member 44 and spring member 42 are accommodated in its intermediate diameter hole, and the pressing member 41 is press-fitted into its large diameter hole, in such a state that the washer "W" is disposed between the pressing member 41 and spring member 42. Furthermore, a bolt-like adjusting member 43 is screwed into a small diameter portion of the stepped hole 21$e$, and supported so that its held position can be adjusted by a tool (not shown) inserted through the through hole 11$h$. After its adjustment, a cap 45 is fixed to the through hole 11$h$. Consequently, the pressing member 41 is held by the biasing force of the spring member 42 so as to be pressed onto the inner surface of the case 11, and it is so configured that when the case 11 (housing 10) and first axial member 21 (rod member 20) move relative to each other, the frictional force is applied to them by the pressing member 41, and the frictional force can be adjusted by the adjusting member 43. With respect to the spring member 42, not only the disk spring but also the compressed coil spring or the like may be employed.

Figure 9:
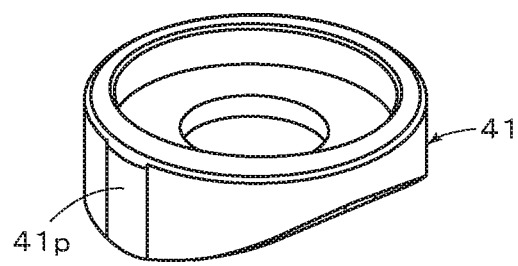
FIG. 9 is a sectional view showing a part of a pressing member for use in embodiments of the present invention.

As described above, the friction mechanism 40 is accommodated in the housing 10 together with the biasing mechanism 30, so that its installing performance on a vehicle is high, and its flexibility of design will be improved. In addition, as the pressing member 41 is formed with its contacting surface in a curved surface, as shown in FIG. 9 for example, and configured to be pressed onto the inner surface of the case 11, so that the pressing area by the pressing member 41 will be enlarged, so that spring load can be made high to ensure the large frictional force (braking force).

The vehicle body reinforcing device as configure above is mounted on the vehicle frames F1 and F2 as indicated by two-dot chain lines in FIG. 1, and secured by bolt. Then, in the case where such outer force that enlarges the axial distance between the brackets BR1 and BR2 is applied, the first spring member 31 as shown in FIG. 2 is compressed, so that the biasing force that shortens the axial distance between the brackets BR1 and BR2 is applied. On the contrary, in the case where such outer force that shortens the axial distance between them is applied, the second spring member 32 is compressed, so that the biasing force that enlarges the axial distance between them is applied. Consequently, the rigidity between the brackets BR1 and BR2 are adjusted, thereby to function as the rigidity adjusting mechanism. During this operation, the frictional force applied to the rod member 20 by the friction mechanism 40 acts as the braking force, to suppress a rapid displacement and minimize amplitude of vibrations, thereby to function as a damping mechanism.

Figure 3:
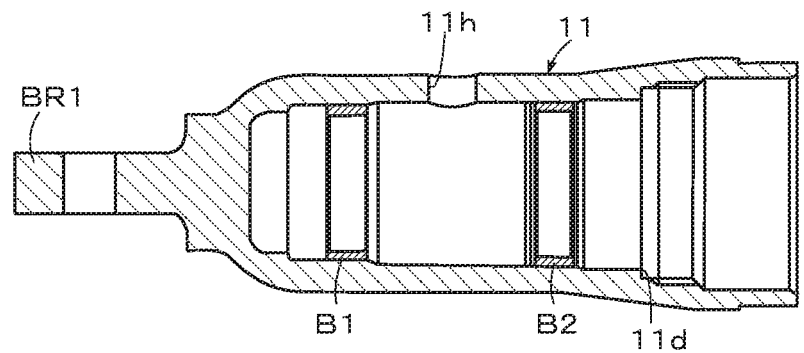
FIG. 3 is a sectional view showing a case for use in an embodiment of the present invention.
Figure 4:
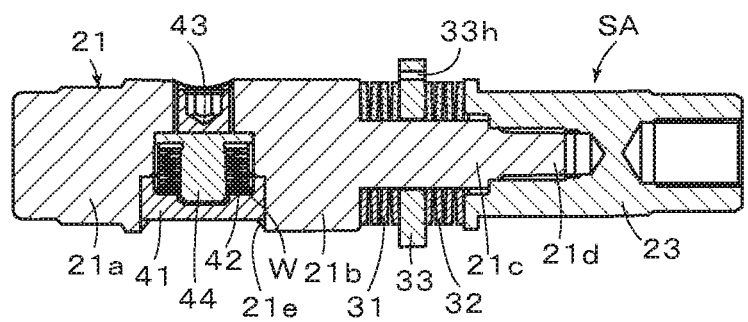
FIG. 4 is a sectional view showing a sub-assembly for use in an embodiment of the present invention.
Figure 5:
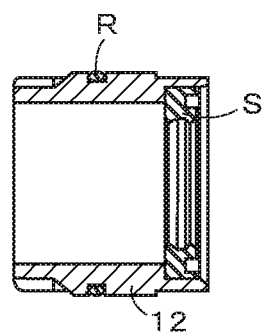
FIG. 5 is a sectional view showing an annular member for use in an embodiment of the present invention.

Next will be explained an assembling process with reference to FIGS. 3-7. At the outset, as shown in FIG. 3, the bushes B1 and B2 are press-fitted into the case 11. Next, a sub-assembly "SA" as shown in FIG. 4 is configured. That is, the support member 44, spring member 42 and washer "W" are accommodated in the intermediate diameter hole of the stepped hole 21e defined in the large diameter portion 21b of the first axial member 21, and the pressing member 41 is press-fitted into its large diameter hole, and the adjusting member 43 is screwed into the small diameter hole of the stepped hole 21e, and held therein. With the pressing member 41 being press-fitted into the hole, the support member 44, spring member 42 and washer "W" are prevented from being fallen down by their own weights. Next, the first spring member 31, engaging member 33 and second spring member 32 are mounted in sequence on the small diameter portion 21c of the first axial member 21. When the male screw portion 21d of the first axial member 21 is screwed with the female screw portion of the connecting member 23, the first spring member 31 is disposed between first axial member 21 and the engaging member 33, and the second spring member 32 is disposed between the engaging member 33 and the connecting member 23, as shown in FIG. 4, whereby the first spring member 31 and second spring member 32 are held to be in such a state as being slightly compressed. Furthermore, as shown in FIG. 5, the seal "S" is fixed to the opening portion of the annular member 12, and the O-ring "R" is fixed to its outer peripheral surface.

Figure 6:
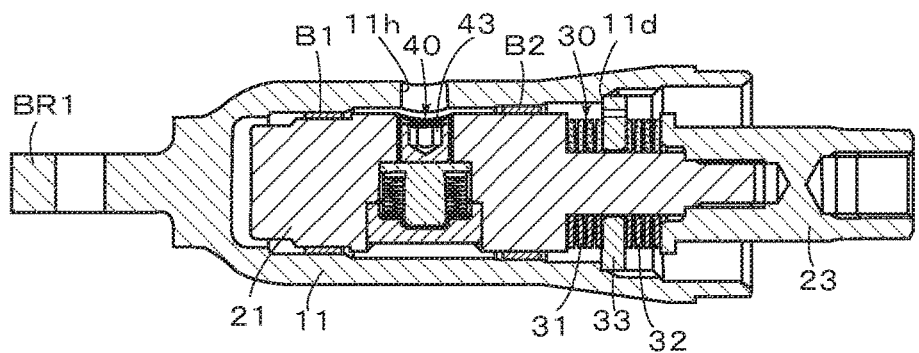
FIG. 6 is a sectional view showing an assembling process for a vehicle body reinforcing device according to an embodiment of the present invention.
Figure 7:
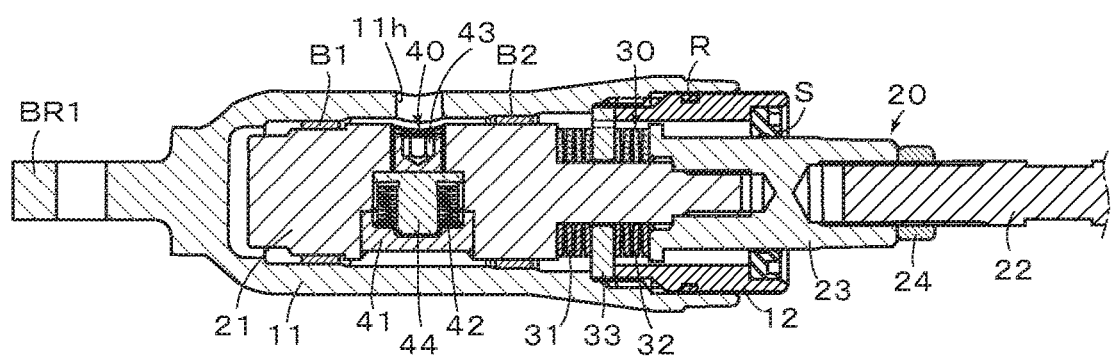
FIG. 7 is a sectional view showing an assembling process for a vehicle body reinforcing device according to an embodiment of the present invention.

Then, the sub-assembly "SA" as shown in FIG. 4 is accommodated in the case 11 as shown in FIG. 3 to become such state as shown in FIG. 6. Then, the annular member 12 is screwed into the opening end portion of the case 11 to form such state as shown in FIG. 7. When the tool is inserted from the through hole 11h to rotate the adjusting member 43, the pressing member 41 is pressed onto the inner surface of the case 11 as shown in FIG. 2, so that the pressing force of the pressing member 41 by the spring member 42, i.e., the frictional force (braking force) applied to the rod member 20 is adjusted. Also, as shown in FIG. 7, the second axial member 22 is screwed into the connecting member 23, and the nut 24 is screwed, thereby to be held at the predetermined position. Then, the cover 13 is connected to the case 11, and the cap 45 is fixed to the through hole 11h, to form such state as shown in FIG. 2.

As described above, each component part may be assembled into the case 11 of the cylindrical shape with the bottom from one side (only from the right side in FIGS. 3-7), so that the mass productivity is improved, and dust and/or water proof features may be easily ensured. Also, as gripping portions or the like of the tools required for assembling it can be gathered at the one side, gripping marks or the like caused by the tools can be concealed by such a minimum member as the above-described cover 13, so that it can be assembled appropriately without being disfigured.

Figure 8:
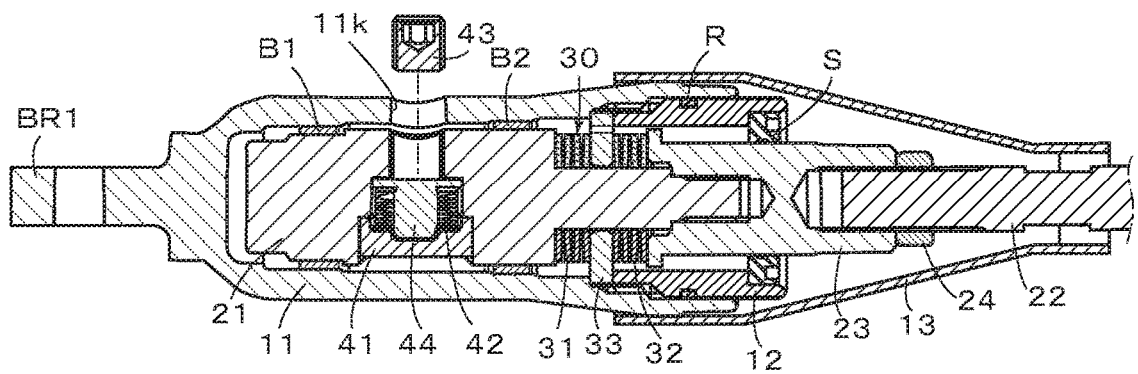
FIG. 8 is a sectional view showing an assembling process for a vehicle body reinforcing device according to another embodiment of the present invention.

FIG. 8 relates to another embodiment of the invention, wherein the case 11 (housing 10) has a through hole 11k (larger in diameter than the through hole 11h) defined at its side wall, through which the adjusting member 43 is inserted from its outside, so that the frictional force by the pressing member 41 is adjusted. Therefore, it is not required to assemble the adjusting member 43 in the form of the sub-assembly "SA" as shown in FIG. 4, but it can be assembled in the form of the final assembly as shown in FIG. 8, so that its screw-engagement can be made longer. According to the present embodiment, therefore, by means of the biasing force of the spring member 42, the pressing member 41 is held so as to be pressed onto the inner surface of the case 11, so that when the case 11 (housing 10) and first axial member 21 (rod member 20) move relative to each other, the frictional force (braking force) is applied to them by the pressing member 41.

Figure 10:
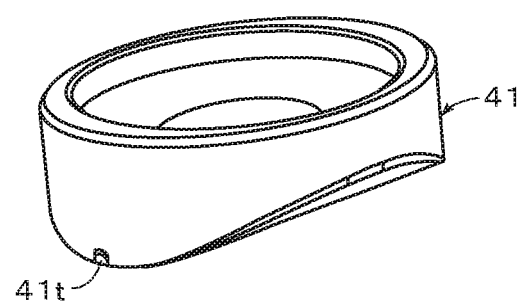
FIG. 10 is a sectional view showing another embodiment of a pressing member for use in embodiments of the present invention.

FIG. 9 relates to one embodiment of the above-described pressing member 41, wherein a rib 41p is formed on a side surface of the pressing member 41 to extend in parallel with the pressing direction. By means of this embodiment, comparing with the complete fitting structure of the pressing member 41 fitted into the large diameter portion of the stepped hole 21e, its performance to be inserted will be improved. Also, the contacting area between the rib 41p and the first axial member 21 (stepped hole 21e thereof) can be set to be large enough so as to provide a sufficient surface pressure against the frictional load in the axial direction of the first axial member 21 (rod member 20), whereby backlash caused by sliding motion of the rod member 20 can be eliminated. Or, without considering the backlash caused by such sliding motion, by focusing on how to hold the pressing member 41 to form the sub-assembly "SA", if a portion to be pressed into the stepped hole 21e is made small, and a protrusion 41t is formed on a side surface of the pressing member 41, as shown in FIG. 10, it can be easily pressed into the stepped hole 21e, even by hand.

DESCRIPTION OF CHARACTERS 10 housing
11 case
12 annular member
13 cover
20 rod member
21 first axial member
22 second axial member
23 connecting member
24 nut
30 biasing mechanism
31 first spring member
32 second spring member
33 engaging member
40 friction mechanism
41 pressing member
42 spring member
43 adjusting member
44 support member

The invention claimed is:
1. A vehicle body reinforcing device comprising:
brackets that support both axial ends of the device on a vehicle body;
a housing which is connected to one bracket of the brackets that support the both ends;

a rod member that has one end portion which is accommodated in the housing, and an other one end portion which is connected to an other one bracket of the brackets that support the both ends;
a biasing mechanism which is disposed between the one end portion of the rod member and the housing, and which biases against forces that enlarge and shorten an axial distance between the one bracket and the other one bracket; and
a friction mechanism which is supported on the rod member within the housing, and which presses the housing in a direction perpendicular to an axis of the rod member, wherein
the friction mechanism comprises:
   a pressing member which is movably supported on the rod member in the direction perpendicular to the axis of the rod member, and which is disposed to be in contact with an inner surface of the housing;
   a spring member which is disposed between the pressing member and the rod member, and which biases the pressing member to press the inner surface of the housing; and
   an adjusting member that adjusts a pressing force of the pressing member to the housing by the spring member,
the rod member has a through hole in the direction perpendicular to the axis of the rod member, and wherein the spring member of the friction mechanism is accommodated in the through hole, and the pressing member is press-fitted into the through hole and held in the through hole together with the spring member, and wherein the adjusting member holds the spring member at a predetermined position in the through hole, and
the friction mechanism comprises a support member which is disposed between the adjusting member and the pressing member, and which supports the spring member movably in the through hole, and wherein the adjusting member holds the support member at a predetermined position in the through hole.

2. The vehicle body reinforcing device as claimed in claim 1, wherein the housing has a side wall thereof with a through hole, and wherein the adjusting member is manipulated through the through hole of the housing.

3. The vehicle body reinforcing device as claimed in claim 1, wherein the housing has an insert hole at a side wall thereof, and wherein the adjusting member is inserted into the housing through the insert hole, and held by the rod member.

4. A vehicle body reinforcing device comprising:
brackets that support both axial ends of the device on a vehicle body;
a housing which is connected to one bracket of the brackets that support the both ends;
a rod member that has one end portion which is accommodated in the housing, and an other one end portion which is connected to an other one bracket of the brackets that support the both ends;
a biasing mechanism which is disposed between the one end portion of the rod member and the housing, and which biases against forces that enlarge and shorten an axial distance between the one bracket and the other one bracket; and
a friction mechanism which is supported on the rod member within the housing, and which presses the housing in a direction perpendicular to an axis of the rod member,
wherein the biasing mechanism comprises a first spring member and a second spring member, which bias the rod member against the axial movement of the rod member.

5. The vehicle body reinforcing device as claimed in claim 4, wherein the biasing mechanism comprises an engaging member which is accommodated in the housing, and which is engaged with the housing at a predetermined axial position of the rod member, and wherein the first spring member and second spring member are engaged with the rod member at axially opposite sides of the rod member through the engaging member.

6. The vehicle body reinforcing device as claimed in claim 5, wherein the rod member comprises a first axial member and a second axial member, and a connecting member that connects the first axial member and the second axial member in an axial direction in the housing, and wherein the biasing mechanism is disposed between the first axial member and the connecting member.

7. The vehicle body reinforcing device as claimed in claim 5, wherein the housing comprises:
a case which is integrally formed with the one bracket in a cylindrical shape with a bottom, and which accommodates the first axial member;
an annular member which is connected to the case, with the engaging member being held between the annular member and an opening portion of the case; and
a cover which is connected to the case, with the annular member, the biasing mechanism, the friction mechanism and a part of the rod member being accommodated in the case.

\* \* \* \* \*